United States Patent [19]
Busbey et al.

[11] Patent Number: 5,988,980
[45] Date of Patent: Nov. 23, 1999

[54] BLADE ASSEMBLY WITH SPLITTER SHROUD

[75] Inventors: Bruce C. Busbey; David W. Crall, both of Loveland; Michael D. Toye, Blanchester, all of Ohio

[73] Assignee: General Electric Company, Cincinnati, Ohio

[21] Appl. No.: 08/925,345

[22] Filed: Sep. 8, 1997

[51] Int. Cl.$^6$ ..................................................... F01D 5/22
[52] U.S. Cl. ........................ 416/193 R; 415/78; 415/79
[58] Field of Search ................................... 416/190, 191, 416/193 R, 189, 196 R; 415/79, 77, 78, 209.4

[56] References Cited

U.S. PATENT DOCUMENTS

| | | | |
|---|---|---|---|
| 1,544,318 | 6/1925 | Hodgkinson | 415/79 |
| 2,007,408 | 7/1935 | Schellens | 415/79 |
| 3,262,635 | 7/1966 | Smuland | 415/77 |
| 3,385,064 | 5/1968 | Wilde et al. . | |
| 3,549,272 | 12/1970 | Bauger et al. . | |
| 3,610,776 | 10/1971 | Petrie . | |
| 3,635,589 | 1/1972 | Kristiansen . | |
| 4,595,340 | 6/1986 | Klassen et al. . | |
| 4,791,783 | 12/1988 | Neitzel . | |
| 5,201,850 | 4/1993 | Lenhardt et al. . | |
| 5,261,227 | 11/1993 | Giffin, II . | |
| 5,402,638 | 4/1995 | Johnson . | |
| 5,404,713 | 4/1995 | Johnson . | |
| 5,562,419 | 10/1996 | Crall et al. . | |

FOREIGN PATENT DOCUMENTS

| | | | |
|---|---|---|---|
| 612056 | 6/1978 | U.S.S.R. | 416/193 R |

*Primary Examiner*—Edward K. Look
*Assistant Examiner*—Richard Woo
*Attorney, Agent, or Firm*—Andrew C. Hess; Rodney M. Young

[57] ABSTRACT

A blade assembly, which may have blisk for a gas turbine engine, includes an annular rim disposed about a rotor axis and a blade assembly disposed around the rim. The blade assembly has circumferentially disposed and radially extending inner and outer rows of inner and outer airfoils, respectively and each airfoil has axially spaced apart leading and trailing airfoil edges. An annular shroud is disposed between and connecting the inner and outer rows of inner and outer airfoils and has axially spaced apart annular leading and trailing shroud edges corresponding to the leading and trailing airfoil edges, respectively. An axially extending cavity is provided in each of the leading and trailing shroud edges for reducing stresses in leading and trailing airfoil edges, respectively and the corresponding airfoil edges are located near the cavities. The cavities preferably extend axially under the corresponding airfoil edges. The cavities may be 360 degree circumferentially extending annular grooves in one embodiment.

10 Claims, 5 Drawing Sheets

BLADE ASSEMBLY WITH SPLITTER SHROUD

BACKGROUND OF THE INVENTION

The Government has rights to this invention pursuant to Contract No. F33615-95-C-2502 awarded by the United States Air Force.

FIELD OF THE INVENTION

This invention relates to a splitter shroud disposed between radially inner and outer circumferential rows of airfoils of a rotor blade assembly for an aircraft gas turbine engine and, more particularly, to the seals and associated seal assembly at annular leading and trailing shroud edges.

DISCUSSION OF THE BACKGROUND ART

A conventional gas turbine engine includes a core engine having in serial, axial flow relationship, a high pressure compressor to compress the airflow entering the core engine, a combustor in which a mixture of fuel and the compressed air is burned to generate a propulsive gas flow, and a high pressure turbine which is rotated by the propulsive gas flow and which is connected by a large diameter first shaft to drive the high pressure compressor. A typical bypass turbofan engine also has a low pressure turbine aft of the high pressure turbine and which drives a forward fan forward of the high pressure compressor with a second shaft concentrically disposed within the first shaft.

In a typical variable bypass ratio design as disclosed in U.S. Pat. No. 4,068,471, the front fan includes one or more forward rows of fan rotor blades and an aft fan disposed in serial, axial flow relationship between the forward fan and the high pressure compressor. The aft fan may have one or more aft rows of fan rotor blades and is connected to the larger-diameter first drive shaft which is driven by the high pressure turbine. A variable area bypass injector is located between the forward and aft fans to vary the amount of air entering a first inlet of a fan bypass duct which varies the fan bypass ratio of the engine (i.e., the ratio of the air flowing through the fan bypass duct to the air flowing through the core engine) from which comes the term variable cycle to describe the engine. The fan bypass duct has a second inlet located aft of the aft row of fan blades.

Multiple bypass stream variable cycle gas turbine engines have also been developed that incorporate flow splitters in the fan and/or compressor sections of the engine, U.S. Pat. Nos. 5,402,638, 5,404,713, and U.S. patent application Ser. No. 08/624,288 which is incorporated herein by reference. Blisks such as that disclosed in U.S. Pat. No. 5,562,419 have radially inner and outer rows of fan or compressor rotor blade airfoils that are separated by a rotatable portion of an annular duct wall, often referred to as a shroud, such that the inner and outer row of rotor blade airfoils are disposed in separate ducts and flowpaths. The annular duct wall or splitter separates these two ducts and annular seals are provided between the rotatable portion of the duct wall and adjacent stationary portions of the duct wall just forward and aft of the rotatable portion. These blisks may be powered by the high pressure turbine section and often subjected to very high stress fields due to centrifugal forces during spool up and high thrust operation. Experience has shown that such a rotor does not do a good job of transmitting the centrifugal loads from the outer airfoil and shroud into the inner airfoil. The resulting poor distribution of loading into the inner airfoil may result in a lack of ability to increase the high pressure compressor rotor speed to levels that might otherwise be achieved. The shroud must transmit its own centrifugal loading as well as the outer airfoil centrifugal loading onto the inner airfoil to be further transmitted into a hub of the blisk. This has a tendency to cause high stresses at both leading and trailing edges of the inner airfoils. These high stresses limit the maximum rotational speed at which the rotor could otherwise operate and still meet good design practices with respect to low and high cycle fatigue.

Blade designers, therefore, are in need of a rotating flow splitter to significantly reduce the leading and trailing edge stresses in the inner airfoil.

SUMMARY OF THE INVENTION

A blisk, for a gas turbine engine, includes an annular rim disposed about a rotor axis and a blade assembly disposed around the rim. The blade assembly has circumferentially disposed and radially extending inner and outer rows of inner and outer airfoils, respectively, and each airfoil has axially spaced apart leading and trailing airfoil edges. An annular shroud is disposed between and connecting the inner and outer rows of inner and outer airfoils and has axially spaced apart annular leading and trailing shroud edges corresponding to the leading and trailing airfoil edges, respectively. An axially extending cavity is provided in each of the leading and trailing shroud edges for reducing stresses in leading and trailing airfoil edges respectively and the corresponding airfoil edges are located near the cavities. The cavities extend axially under the corresponding airfoil edges. The cavities may be 360 degree circumferentially extending annular grooves in one embodiment. Another embodiment has cavities in the form of leading and trailing pluralities of circumferentially extending semi-annular grooved pockets that axially extend into the leading and trailing shroud edges, respectively, with each of the pockets being substantially circumferentially aligned with a corresponding one of the airfoil edges of the outer airfoils. Another embodiment has a plurality of groups of circumferentially canted holes axially extending into the shroud edges. Each of the groups is substantially circumferentially aligned with a corresponding one of the airfoil edges of the outer airfoils and canted in a direction from the corresponding outer airfoil leading to trailing edges. The blisk of this invention is particularly useful as part of a rotor powered by a high pressure turbine of a gas generator in a multiple bypass aircraft gas turbine engine.

ADVANTAGES OF THE INVENTION

The present invention provides advantages that include a significant reduction in the inner airfoil leading and trailing edge stresses caused by the shroud and outer airfoil centrifugal loads. The ability to run the rotor to higher tip speeds than with a conventional solid annular shrouds. Under centrifugal loading the addition of the groove results in additional flexibility of the shroud which causes the leading and trailing edges of the outer airfoil to be in compression near the airfoil root which helps provide maximum vibratory stress capability.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
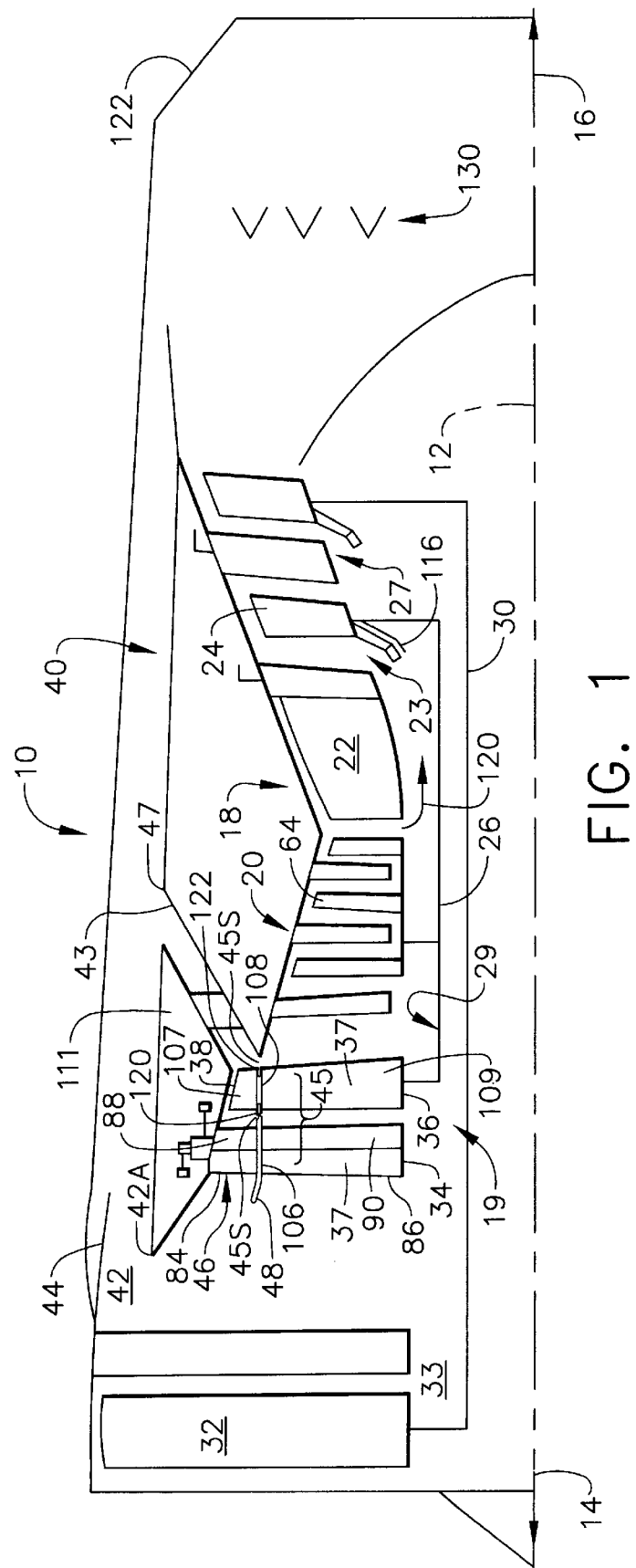
FIG. 1 is a schematic cross-sectional side view of a bypass turbofan engine incorporating a blisk having a splitter in accordance with one embodiment of the present invention.
Figure 2:
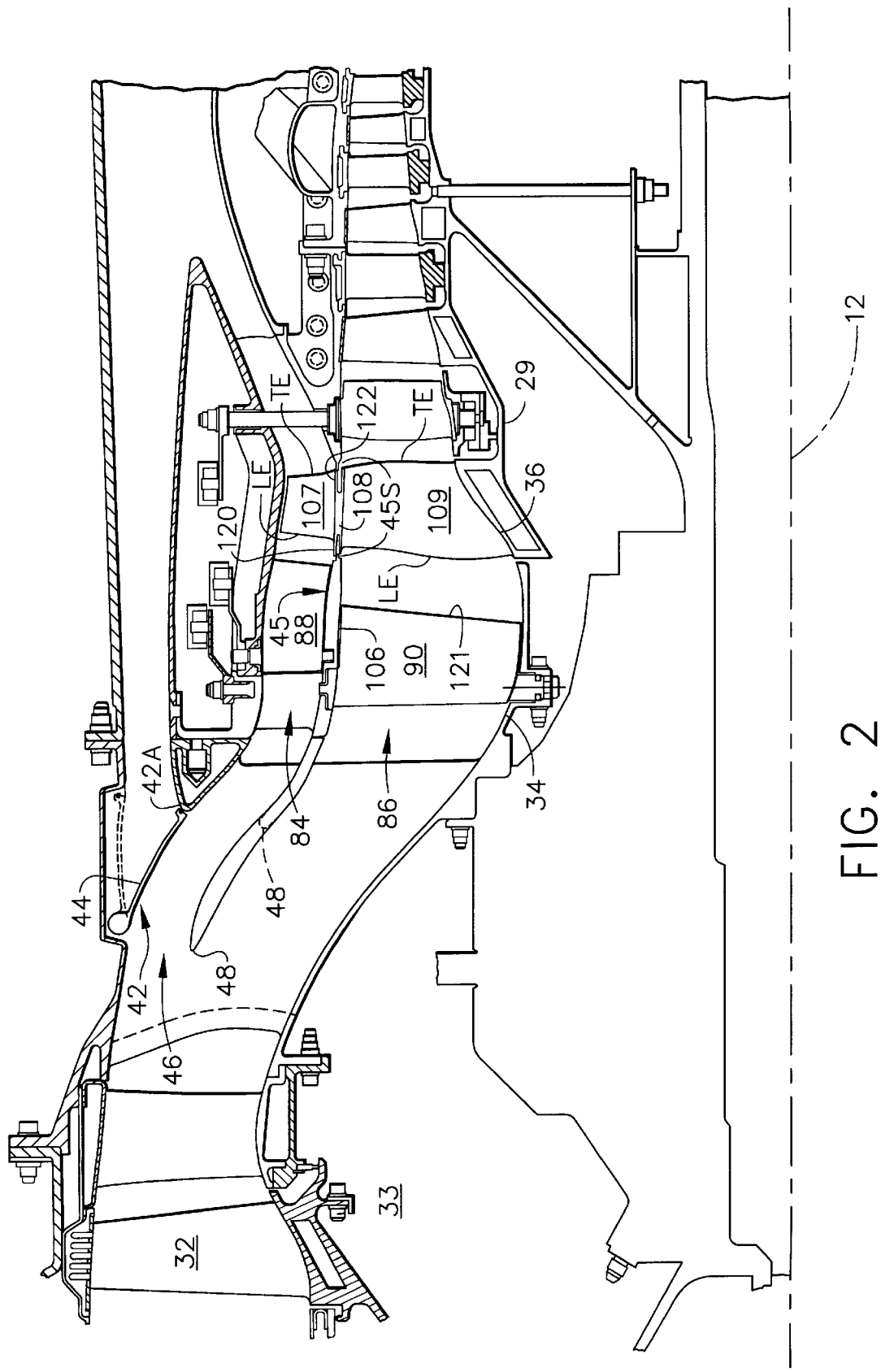
FIG. 2 is an enlarged schematic cross-sectional side view of a more particular embodiment of the bypass turbofan engine in FIG. 1 around the blisk.

Referring now to the drawing, there is illustrated in FIGS. 1 and 2 a bypass turbofan gas turbine engine 10 having a generally longitudinally extending axis or centerline 12 generally extending in a forward direction 14 and an aft direction 16. The bypass turbofan engine 10 includes a core engine 18 (also called a gas generator) which includes a core driven fan (CDF) in 19, a high pressure compressor 20, a combustor 22, and a high pressure turbine (HPT) 23 having a row of high pressure turbine (HPT) blades 24, all arranged in a serial, axial flow relationship. High pressure compressor blades 64 of the high pressure compressor 20 and the CDF 19 are fixedly interconnected in driving engagement to the high pressure turbine blades 24 by a larger diameter annular core engine shaft 26 which is disposed coaxially about the centerline 12 of the engine 10 forming a high pressure spool or rotor 29.

The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the high pressure compressor 20. The combustion gases are discharged from the core engine 18 into a power turbine or low pressure turbine (LPT) 27 having a row of low pressure turbine rotor (LPT) blades 28. The low pressure turbine rotor blades 28 are fixedly attached to a smaller diameter annular low pressure shaft 30 which is disposed coaxially about the centerline 12 of the engine 10 within the core engine shaft 26 forming a low pressure spool. The low pressure shaft 30 rotates a more longitudinally forward row of generally radially outwardly extending and circumferentially spaced-apart forward fan rotor blades 32 of a forward fan 33. The core engine shaft 26 also rotates a more longitudinally aft apart core driven or aft fan rotor blade assembly 36, in accordance with one embodiment of the present invention, having generally radially outwardly extending blade tips 38. The aft fan rotor blade assembly 36 is disposed longitudinally aft of the more longitudinally forward row of forward fan rotor blades 32. A row of circumferentially spaced-apart aft fan stator vanes 34 (attached at either or both radial ends) is disposed longitudinally between the forward fan 33 and the aft fan rotor assembly 36.

A fan bypass duct 40 has a first inlet 42 disposed longitudinally between the forward fan 33 and the aft or core driven fan 19. The first inlet 42 includes a front selector valve door 44 and a first flow splitter 42A. A second inlet 46 to the fan bypass duct 40 is also disposed longitudinally between the forward fan 33 and the aft or core driven fan 19, thereby providing two parallel bypass flowpaths into the fan bypass duct from the forward fan. The fan bypass duct 40 is in fluid communication with a second inlet 46 by way of a second inlet duct 43 having a second inlet duct outlet 47 to the fan bypass duct 40. The second inlet 46 includes an annular duct wall 45 with a second flow splitter 48. The annular duct wall 45 includes a rotatable portion commonly referred to as a shroud 108 of the aft CDF 19. Annular seals 45S are provided between the rotatable shroud 108 of the annular duct wall 45 and adjacent stationary portions of the wall just forward and aft of it.

Illustrated in FIG. 2 is a more particular design of the engine 10 and CDF 19 illustrating the shroud 108 of the annular duct wall 45 that rotates with the high pressure spool. The second flow splitter 48 may be axially positioned forward of (denoted by the solid line) or proximate to (denoted by the dashed line) the first flow splitter 42A axial location depending on the particular aerodynamic considerations for a given engine. The radially outer airfoils 107 and radially inner airfoils 109 of blade assembly 37 have different airfoils with separate non-continuous profiles and leading and trailing edges LE and TE, respectively. The outer airfoils 107 may or may not be indexed, one to one, and generally aligned with the inner airfoils 109. The same construction may be also be applied to the radially outer vane tip portions 84 and the radially inner vane hub portions 86 of the fan vanes 34. The vane tip portion 84 may have an extended length pivotable trailing-edge tip flap 88 that extends aft of the trailing edge 121 of the independently pivotable trailing-edge inner flap 90 radially inner hub portion 86. The annular seals 45S cooperate with lands 138 of adjacent stationary portions of the wall 45. The engine and its operation are described in more detail in U.S. patent application Ser. No. 08/642,288.

Figure 3:
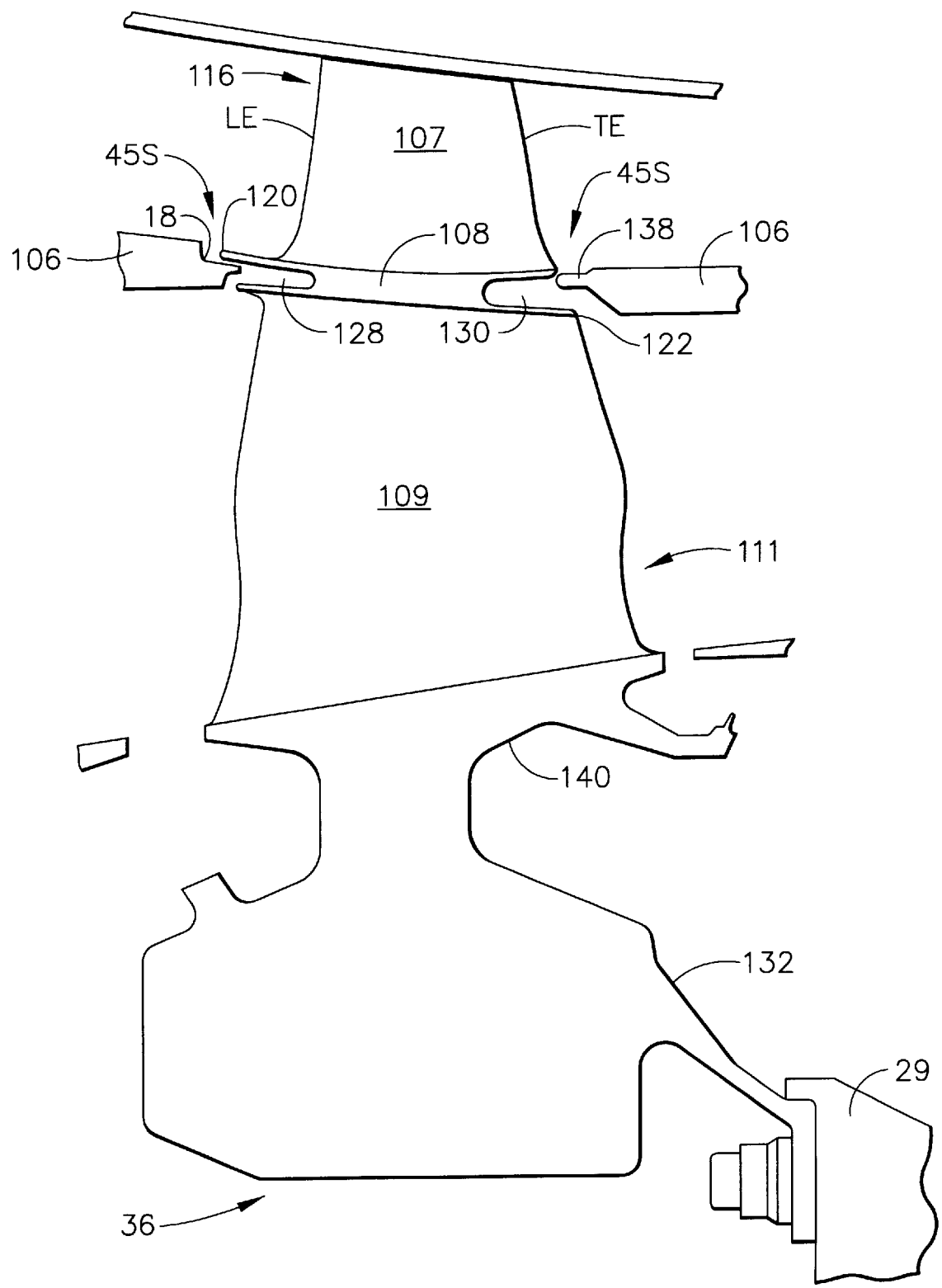
FIG. 3 is an enlarged schematic cross-sectional side view of the blisk in FIG. 2.

Referring now with more particularity to FIGS. 2 and 3, the shroud 108 is disposed radially between a radially outer row 116 of outer airfoils 107 and a radially inner row 111 of inner airfoils 109, respectively of the aft CDF 19. The annular duct wall 45 also includes a non-rotatable portion 106 that is disposed between, preferably variable angle, radially outer vane tip portions 84 and radially inner vane hub portions 86 of the fan vanes 34. Annular seals 45S are provided to prevent or inhibit leakage around the shroud 108. The seals 45S include axially spaced apart annular leading and trailing shroud edges 120 and 122, respectively (also shown in FIG. 1) corresponding to leading and trailing airfoil edges LE and TE, respectively of the outer airfoils 107. Empty leading and trailing cavities 128 and 130, respectively (also shown in FIG. 1) extend axially into the shroud 108 from the leading and trailing shroud edges 120 and 122. This provides a means for reducing stresses in the leading and trailing airfoil edges LE and TE, respectively of the inner and outer airfoils 107 and the corresponding airfoil edges are located near the cavities. The cavities are structural voids that prevent or reduce centrifugal loads from being transmitted to the leading and trailing airfoil edges LE and TE, respectively of the inner and outer airfoils 109 and 107, respectively.

Figure 4:
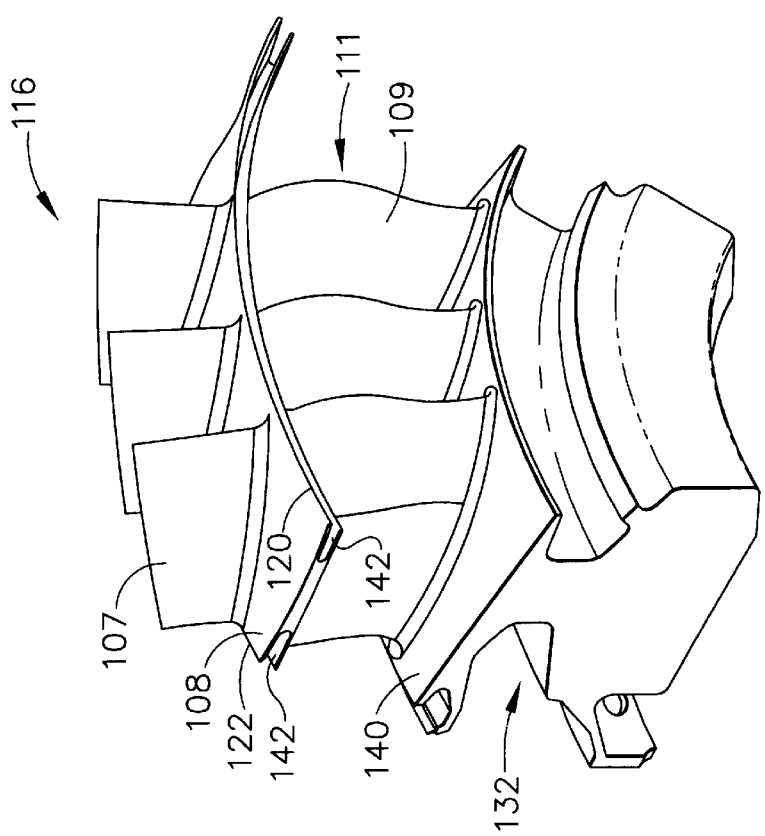
FIG. 4 is a perspective view of the blisk in FIG. 3 having an annular groove cavity.

FIGS. 3 and 4 illustrate, in more detail, a more particular embodiment of the present invention where the blade assembly 36 in the form of a blisk 132 having an annular hub or rim 140 disposed about a rotor axis which is centerline 12 and the blade assembly 36 is disposed around the rim. The shroud 108 is disposed radially between the radially outer row 116 of outer airfoils 107 and the radially inner row 111 of inner airfoils 109. The radially outer row 116 of outer airfoils 107 are integrally mounted to the rim 140. The leading and trailing cavities 128 and 130 are full 360 degree annular grooves 142 extending axially into the shroud 108 from the leading and trailing shroud edges 120 and 122. The grooves 142 extend axially under the leading and trailing airfoil edges LE and TE, respectively of the outer airfoils 107. The blisk of this invention is particularly useful as part of a rotor powered by the high pressure turbine HPT of an aircraft gas turbine engine.

Figure 5:
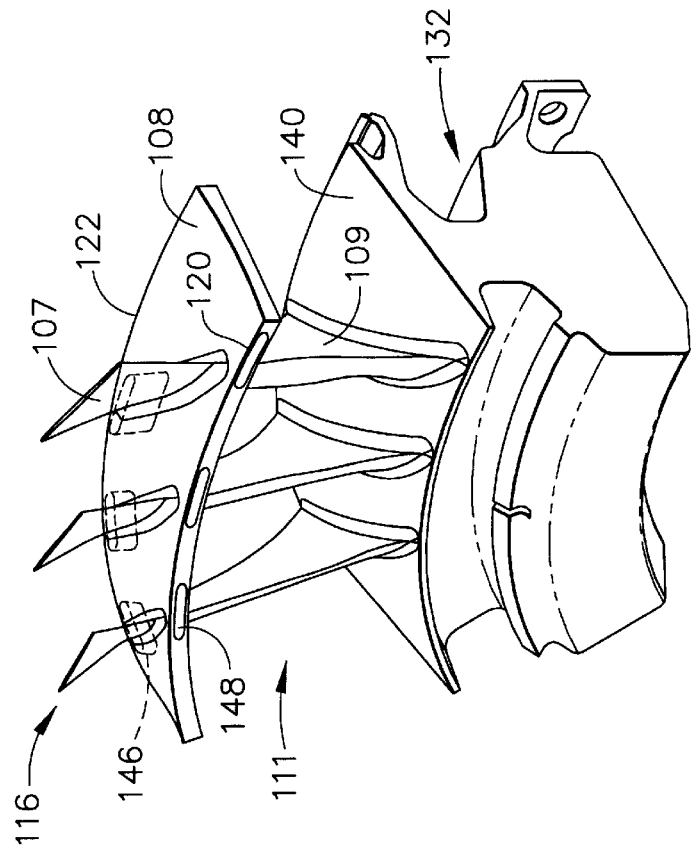
FIG. 5 is a perspective view of a first alternative embodiment of the blisk in FIG. 3 having pocket cavities.

FIG. 5 illustrates another embodiment of the present invention in which the cavities are in the form of leading and trailing pluralities of circumferentially extending semi-annular grooved pockets 146 extending axially into the shroud 108 from the leading and trailing shroud edges 120 and 122. The pockets 146 extend axially under the leading and trailing airfoil edges LE and TE, respectively of the outer airfoils 107.

Figure 6:
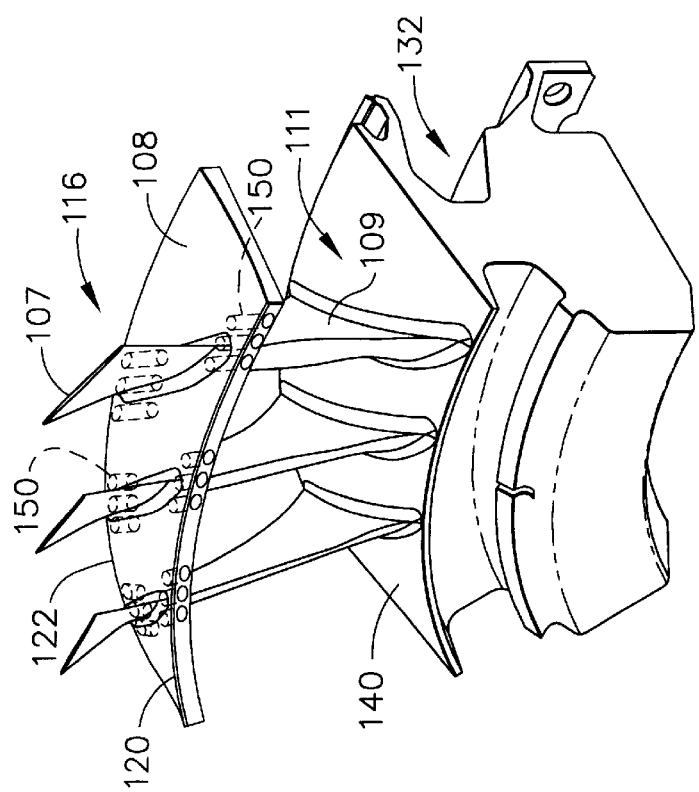
FIG. 6 is a perspective view of a second alternative embodiment of the blisk in FIG. 3 having canted hole cavities.

FIG. 6 illustrates another embodiment of the present invention in which the cavities are in the form of groups 148 of circumferentially canted holes 150 extending axially into the shroud 108 from the leading and trailing shroud edges 120 and 122. The holes 150 extend axially under the leading and trailing airfoil edges LE and TE, respectively of the outer airfoils 107. The holes 150 are substantially circumferentially aligned with a corresponding one of the leading and trailing airfoil edges LE and TE, respectively of the outer airfoils 107 and canted circumferentially in a direction from the corresponding outer airfoil leading to trailing edges.

Figure 7:
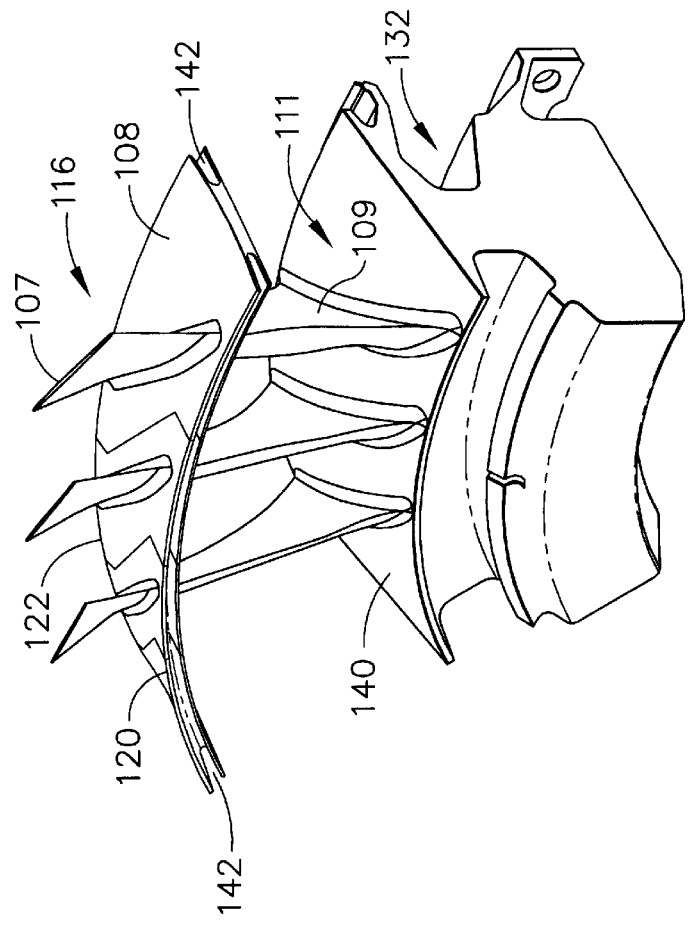
FIG. 7 is a perspective view of a third alternative embodiment of the blisk in FIG. 3 having a segmented shroud.

FIG. 7 illustrates another embodiment of the present invention in which the shroud 108 is segmented such as the one disclosed in U.S. Pat. No. 5,562,419 which is incorporated herein by reference.

A friction damper can be designed to fit inside the groove, such as a wire damper, and used to damp both inner and outer airfoil vibratory modes. The present invention may also be used with segmented shrouds such as those disclosed in U.S. Pat. No. 5,562,419. The annular seals 45S are illustrated as tongue and groove seals where the tongue is provided by annular knife edges on stationary portions of the annular duct wall 45 which are cooperatively disposed within the grooves 142. The seals for the embodiments having the grooved pockets (FIG. 5) and the canted holes (FIG. 6) use either abutting edges, overlapping edges, or some other kind of sealing means that are well known in the field such as shiplap seals.

While the preferred embodiment of our invention has been described fully in order to explain its principles, it is understood that various modifications or alterations may be made to the preferred embodiment without departing from the scope of the invention as set forth in the appended claims.

What is claimed is:

1. A gas turbine engine blade assembly comprising:
   circumferentially disposed and radially extending inner and outer rows of inner and outer rotatable airfoils respectively,
   each airfoil having axially spaced apart leading and trailing airfoil edges,
   an annular shroud disposed between and connecting said rows of airfoils and having axially spaced apart leading and trailing shroud edges corresponding to said leading and trailing airfoil edges respectively, and
   an axially extending cavity means in one of said shroud edges for reducing stresses in corresponding airfoil edges of said inner and outer airfoils wherein said corresponding airfoil edges are located near said means.

2. An assembly as claimed in claim 1 wherein said cavity means extends axially under said corresponding airfoil edges.

3. An assembly as claimed in claim 1 wherein said cavity means is a 360 degree circumferentially extending annular groove axially extending into said one of said shroud edges.

4. An assembly as claimed in claim 1 wherein said cavity means is a plurality of circumferentially extending semi-annular grooved pockets axially extending into said one of said shroud edges and each of said pockets is substantially circumferentially aligned with a corresponding one of said airfoil edges of said outer airfoils.

5. An assembly as claimed in claim 1 wherein said cavity means is a plurality of groups of circumferentially canted holes axially extending into said one of said shroud edges and each of said groups is substantially circumferentially aligned with a corresponding one of said airfoil edges of said outer airfoils and canted in a direction from said corresponding leading to trailing outer airfoil edges.

6. A blisk for a gas turbine engine, said blisk comprising:
   an annular rotatable rim disposed about a rotor axis,
   a blade assembly disposed around said rim,
   said blade assembly having circumferentially disposed and radially extending inner and outer rows of inner and outer airfoils respectively,
   each airfoil having axially spaced apart leading and trailing airfoil edges,
   an annular shroud disposed between and connecting said rows of airfoils and having axially spaced apart leading and trailing shroud edges corresponding to said leading and trailing airfoil edges respectively, and
   axially extending cavity means in said leading and trailing shroud edges for reducing stresses in leading and trailing airfoil edges respectively, and said corresponding airfoil edges are located near said means.

7. A blisk as claimed in claim 6 wherein said cavity means extends axially under said corresponding airfoil edges.

8. A blisk as claimed in claim 7 wherein said cavity means are 360 degree circumferentially extending annular grooves, one of each of said grooves extending axially into one of each of said shroud edges.

9. A blisk as claimed in claim 7 wherein said cavity means is leading and trailing pluralities of circumferentially extending semi-annular grooved pockets axially extending into said leading and trailing shroud edges respectively and each of said pockets is substantially circumferentially aligned with a corresponding one of said airfoil edges of said outer airfoils.

10. A blisk as claimed in claim 7 wherein each of said cavity means is a plurality of groups of circumferentially canted holes axially extending into said shroud edges and each of said groups is substantially circumferentially aligned with a corresponding one of said airfoil edges of said outer airfoils and canted in a direction from said corresponding leading to trailing outer airfoil edges.

* * * * *